April 3, 1962 C. B. TURTON 3,028,460
BUSWAY PLUG POWER TAKE-OFF DEVICES
Filed July 21, 1960 2 Sheets-Sheet 1

Inventor:
Cecil B. Turton,
by J. Wesley Hamburr
Attorney.

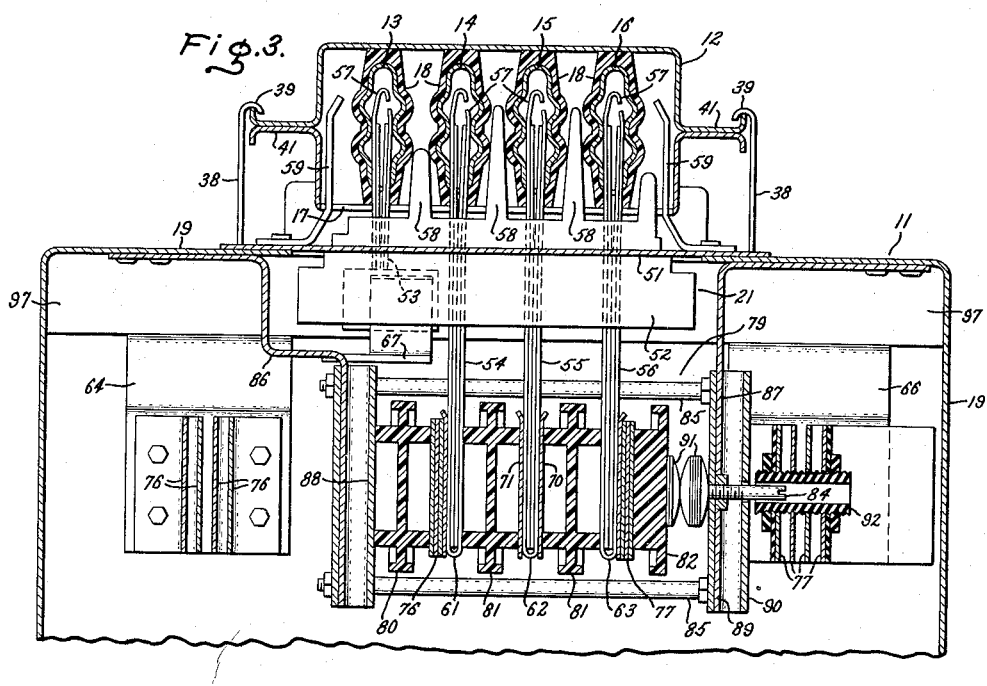

United States Patent Office 3,028,460
Patented Apr. 3, 1962

3,028,460
BUSWAY PLUG POWER TAKE-OFF DEVICES
Cecil B. Turton, Bristol, Conn., assignor to General Electric Company, a corporation of New York
Filed July 21, 1960, Ser. No. 44,336
4 Claims. (Cl. 200—51)

This invention relates to the art of electric power distribution, and more particularly to plug-in type power take-off devices or plugs for electric power busways.

Bus bar distribution systems, commonly referred to as busways, are used for the safe and efficient distribution of polyphase electric power in industrial plants, office buildings and the like. In essence a busway comprises a plurality of elongated electrical conductors or bus bars connected for energization to the respective phases of a polyphase electric power source and enclosed in a grounded metal unit or housing. The bus bars are supported in side-by-side, spaced-apart relation within the metal housing, and suitable insulation is provided to ensure that each phase is electrically isolated from the other phases and from ground.

Plug-in type busways are busways having provisions at spaced intervals for the convenient connection of removable enclosures or units enclosing power tap-off devices such as safety switches, circuit breakers, fuses or the like providing a controlled supply of electric power to individual utilization circuits. Each plug-in unit is removably mounted at an appropriate location on the busway housing, and the circuit controlling device enclosed therein is connected to the electric power source by means of suitable plug-in type disconnect contacts disposed to engage cooperating uninsulated portions of the respective bus bars. Such units are known as busway plugs.

In order to obtain desirable flexibility and convenience, plug-in type busways conventionally are each arranged for quick and easy mounting and dismounting of a number of different busway plug units. Since many different designs of busways and many kinds of busway plugs must be made commercially available to satisfy the widely varying requisites encountered in the art of electric power distribution, realization of the desired degree of flexibility and interchangeability could easily involve furnishing an inordinate variety of busway plug models, with correspondingly high manufacturing and inventory costs. A convenient analytical approach to the task of supplying a large variety of devices to meet varying customer requirements is to construct the devices from modular components which are useful in different combinations. This is sometimes referred to colloquially as the building block technique.

The present invention addresses itself to the problem of heat generation and dissipation in those cases where electrical devices within the busway plugs must be confined closely within a modular and comparatively small enclosure.

It is a general object of the invention to provide a busway plug unit which makes particularly effective and efficient utilization of its enclosure and of the conductors within to dissipate the heat generated within the enclosure by substantial electrical currents transmitted through the busway plug.

It is a more particular object of the invention to provide a busway plug unit in which the electrical connections between closely spaced terminal points within the enclosure are arranged and constructed to maximize heat transfer from the terminal points to the enclosure of the busway plug unit.

In carrying out the invention in one form I provide a busway plug unit having three disengageable electrical contacts projecting from a back surface thereof closely adjacent one of its sides, the contacts being closely spaced for cooperative plug-in engagement with bus bars in an enclosed three phase busway system. The disengageable contacts extend within the enclosure and terminate in closely spaced incoming terminals therein. Within the enclosure are arranged switching units with their aligned terminals spaced in a row closely adjacent the incoming terminals. The electrical conductors which connect the incoming terminals with the line terminals of the switching devices are formed of laminated conducting strips arranged within the limited space allowable to dissipate the heat developed at or near the terminals in a unique fashion. One laminated conductor, the central one, extends in a direct line from the middle plug terminal to the central line terminal of the switching device but also includes extensions of the laminated conductor which project outwardly from the plug terminal toward the enclosure wall where they are bent to extend along the enclosure wall for a substantial area, being electrically insulated from the enclosure wall by a thin sheet of insulating material which promotes heat transfer to the wall of the enclosure. The outer laminated conductors, instead of extending directly between their associated terminals, are formed in a rectangular near-spiral which projects outwardly toward the wall of the enclosure from the incoming terminals and turns by progressive bends, the conductor laminations being spaced apart to promote radiation and convection, until they join their respective line terminals on the switching device.

Further details of the invention as well as additional objects and advantages are set forth in the following more complete description in connection with the accompanying drawings wherein:

FIGURE 3 is a cross-sectional view taken on line 3—3 of FIGURE 1; and

FIGURE 4 is an enlarged view of a portion of FIGURE 2 showing in greater detail certain construction features.

Figure 1:
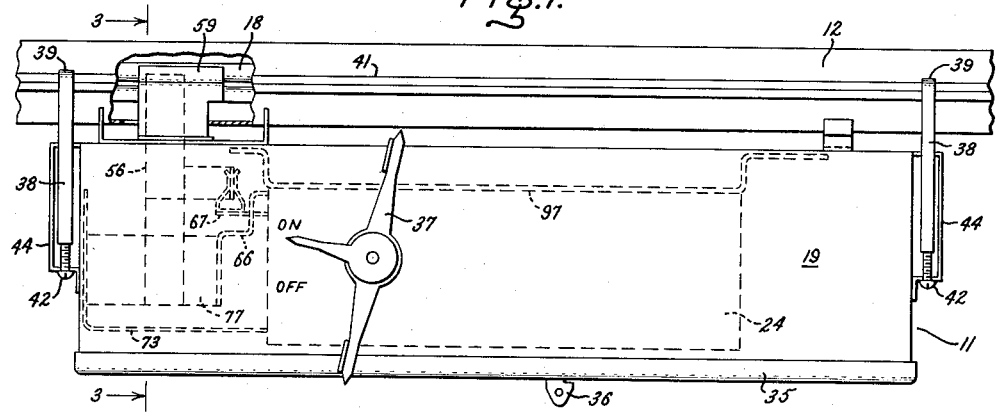
FIGURE 1 is a side view of a busway plug unit constructed in accordance with the invention showing it attached to a length of busway, a portion of the busway housing being broken away.

Referring now to FIGURES 1 and 3, a busway plug unit 11 is shown removably mounted on the housing 12 of a busway length or section enclosing four elongated parallel bus bars 13, 14, 15, and 16. In order to accommodate various kinds of tap-off devices, an aperture 17 is provided in the busway housing for limited access to the bus bars supported therein. The bus bars are part of an electric power distribution system including a three-phase four conductor alternating current source (not shown) to which the bus bars are connected for energization. The bus bars are individually sheathed by suitable electrical insulation 18 and, in the embodiment shown, are generally tubular in form with an oblong cross-section as indicated clearly in FIGURE 3.

The busway plug unit 11 comprises a separate sheet metal box-like enclosure 19 and a detachable contact base assembly 21. Circuit controlling means, including a switching device made up of three single-pole circuit interrupter units 22, 23, and 24 illustrated in FIGURE 2 by way of example, are mounted within the enclosure 19 with their actuating levers ganged together by a common operating bar 25. To the load side of each circuit interrupter is connected a circuit protecting fuse 26, 27, and 28 respectively through which all the current supplied through each interrupter unit flows. The fuses are attached by conventional fuse clips 29 at one end to their respective interrupter units, and at the other end to suitable wiring terminals 31, 32, and 33 from which power is drawn to the various load devices. A space 34 is provided at the end of the busway plug unit adjacent terminals 31, 32, and 33 for the necessary load conductors which must be brought into the enclosure. A hinged cover 35, releasably latched at 36, permits access to the interior of the enclosure 19, and a pivotally mounted operating handle 37 is carried on the side of the enclosure for actuating the switch operating bar 25 from outside the unit.

The removable plug unit 11 is mounted on the busway housing 12 by means of two pairs of elongated hanger members 38 each having a hook-like end 39 for engaging a flange portion 41 of the housing 12, as best seen in FIGURES 1 and 3. The opposite end of each hanger member is bent over and tapped for receiving a cooperating bolt 42. Each bolt 42 extends through an appropriate slot 43 (see FIGURE 2) in brackets 44 which are affixed to opposite ends of this sheet metal enclosure 19. The bolt heads are too large to pass through the slots 43, and by tightening the bolts into the threaded ends of hanger members 38, the busway plug unit 11 is firmly, but removably, attached to the busway housing 12.

As best seen in FIGURE 3, the contact base assembly 21 of the plug unit 11 includes a metal frame or supporting plate 51 which is detachably mounted on the rear wall of the enclosure 19 as shown in FIGURE 3. Affixed to the plate 51 is a base 52 of insulating material which supports four spaced conducting stab contacts 53, 54, 55 and 56 of conducting material such as copper. Each of the stab contacts is formed as a single continuous double-ended stab contact member supported somewhat loosely at an intermediate portion thereof by means not shown within the body of base 52.

The stab contact members extend from within to without the busway plug unit 11. The external ends 57 of these members enter the busway housing 12 through aperture 17 and are adapted for plug-in connection to the respective tubular bus conductors 13 through 16. For this purpose each of the bus bars 13 through 16 is slotted at an edge portion and an appropriate portion of the insulating sheet 18 is removed over each slot to permit the resilient stab contacts formed at the external ends of the contact members to enter the respective slots and engage the inner walls of the bus conductors. Appropriate insulating barriers 58 on the base member 52 also project through the aperture 17 into the busway housing 12 and are disposed between the bus bars 13 through 16 to aid in electrically isolating the different phases. For the purpose of guiding the external stab contacts 57 of the contact members 53 through 56 into proper engagement with the bus bars 13 through 16 and for protecting these contacts from damage when the plug unit 11 is being shipped and handled, a pair of side barriers 59 are carried by the supporting plate 51. When the plug unit 11 is being mounted on the busway housing 12, the barriers 59 enter the aperture 17 at opposite ends thereof and slide along the inner surfaces of the side walls of the busway housing thereby determining the course of movement of the unit 11.

Three of the contact members 54, 55, and 56 electrically connected to the three electrical phases have internal terminals in the form of blade-like ends 61, 62, and 63 located inside of the plug unit 11 in a row adjacent one wall of the enclosure. These internal terminals of members 54 through 56 are arranged to be connected to the respective line terminals 64, 65, and 66 of the switching device. The internal end of the neutral contact member 53 is connected to a ground or neutral strap 67 disposed within the enclosure 19.

Figure 2:
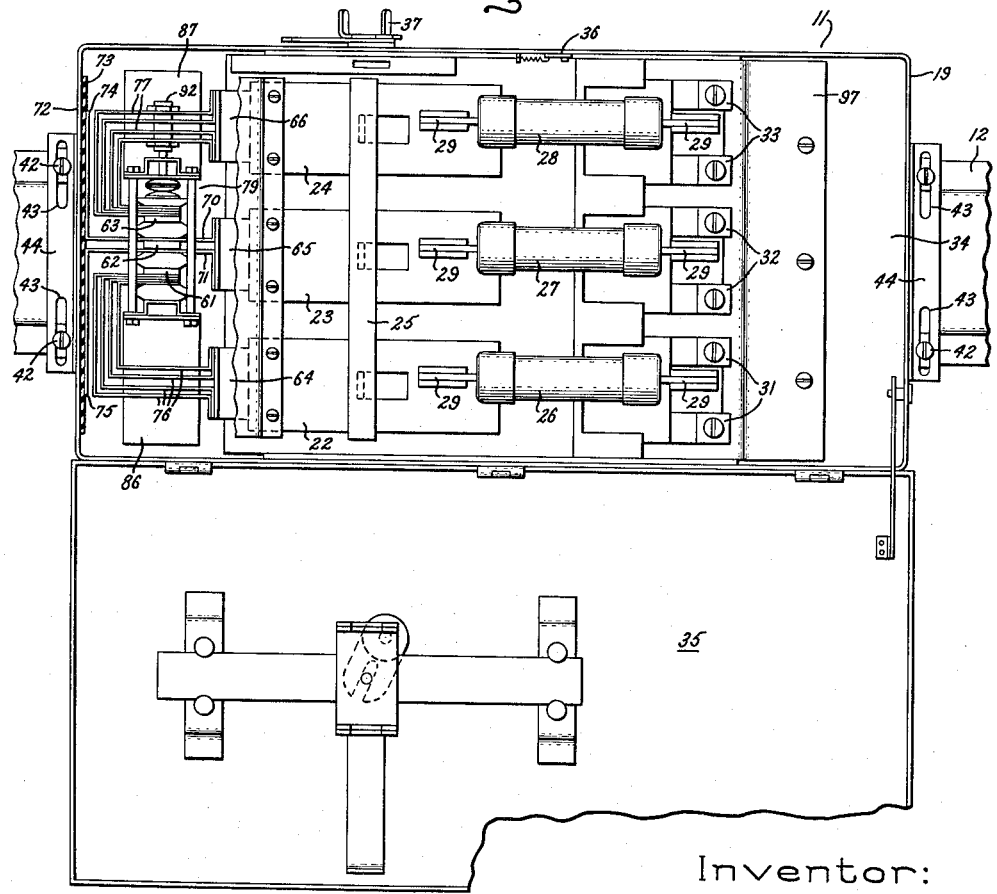
FIGURE 2 is a plan view of the busway plug of FIGURE 1 shown with the cover open.

As can be seen, especially in FIGURE 2, the row of internal terminals 61, 62, and 63 of the contact members is spaced very close to the row of line terminals 64, 65, and 66 on the switching device. The necessarily close spacing poses problems with respect to the dissipation of heat generated by the electrical currents in the apparatus. As is well known to those who are familiar with these arts, among the significant sources of heat in electrical equipment of this general nature are the connection points between the different conductive elements. In this embodiment the connections not only at the internal stab terminals 61 through 63 but also at the switching device line terminals 64 through 66 are sources of heat in addition to other potential sources within the switching device.

In accordance with the present invention the conductors electrically connecting the internal stab terminals and the switching device line terminals are constructed and arranged in such a way as to maximize the dissipation of heat despite the short distance between the terminals and to prevent the build-up of excessive temperatures. The conductors employed for this purpose are arranged in phase groups, each of which is made up of two or more conductive laminations. The outer two-phase groups of conductors, formed of laminations 76 and 77 respectively, do not extend by the shortest route between the respective internal terminals and the switching device line terminals associated therewith, but follow instead a serpentine path. Conductor laminations 76, for example, extend outwardly from clamped engagement with the internal stab terminal 61 toward the adjacent wall of the enclosure. These laminations are, a short distance from the internal stab terminal, bent at right angles to extend a short distance in spaced apart relationship parallel to the wall 72 of the enclosure. At the end of this course the conductor laminations 76 are again bent and extend backward still in spaced apart relationship until, having executed a rectangular near-spiral, they engage the switching device line terminal 64 and are fastened thereto by bolts or the like. Conductor laminations 77 are fashioned in a similar manner but turn in a reverse direction between their engagement points with the internal stab member 61 and the switching device line terminal 66. This arrangement of the two outer sets or phase groups of conductors provides within the small space available a substantial surface area on each set of conductors to dissipate heat through radiation and convection to the outer enclosure, thereby promoting cooling of the plug unit. All radiating surfaces of the conductive laminations are preferably coated with a dull lacquer finish of dark color to improve their heat dissipation properties.

No such arrangement is possible, because of even greater space limitations, for the conductor phase group joining the central ones of the internal stab terminals and the switching device line terminals 62 and 65 respectively. This phase group is formed instead of a pair of laminations 70 and 71 clamped on either side of the internal terminal 62 and extending directly to the line terminal 65 by the shortest route. But these laminations 70 and 71 project also in the opposite direction toward and along the nearest sidewall 72 of the enclosure, being separated therefrom by a thin sheet of insulating material 73 such as butyl rubber in intimate thermal contact with the laminations and the enclosure wall. The extensions 74 and 75 of the central phase group conductors are not provided for current-carrying purposes. Their sole function is to draw heat away from the assembly and to promote the transfer of this heat to the larger heat sink which is provided by side wall 72 of the enclosure. This function is enhanced by the substantial area across which the extensions 74 and 75 are in thermal contact with the wall of the enclosure as well as by the thinness of the electrical insulation 73 which provides electrical isolation between these components.

The contact base assembly 21 including the contact members 53 through 56 and insulating base 52 is removable and interchangeable with other contact base assemblies of a generally similar but differently proportioned construction. The purpose of this interchangeability is to enable each basic or standard or busway plug enclosure to be conveniently adapted to fit a plurality of different busway designs merely by selecting the appropriate one of a variety of available contact base assemblies. Since the cost of producing and stocking a wide variety of interchangeable contact base assemblies is considerably less than the expense of making available a correspondingly wide variety of completely assembled busway plugs, a desirable degree of flexibility and interchangeability is realized economically.

The electrical connection between the internal terminals of the contact members and the laminated conductors is accomplished by a compact clamping assembly 79 (see especially FIGURES 3 and 4) that provides high contact pressure and convenient connectibility. The ends of the laminated conductors 70, 71, 76 and 77 are interleaved in overlapping arrangement with the internal terminals 61, 62 and 63 in a combination joint assembly which includes insulating spacers 80, 81, and 82 to insulate and isolate the different phase connections. For convenient connectibility the clamping assembly 79 includes a single force-applying bolt 84 operable to apply and release the contacting pressure at the joint. With the contacting pressure released, the joint is sufficiently loose that the contact base assembly may be freely and easily withdrawn from or inserted with its internal terminals among the ends of the laminated conductors within the enclosure. With the contacting pressure applied, firm electrical joints of relatively low resistance are formed for conducting polyphase currents of relatively high magnitudes with minimum heat generation and power loss. In FIGURES 3 and 4 it can be observed that the clamping assembly 79 includes four metallic tie rods 85 traversing the joint assembly. These tie rods preferably covered by an insulating sheath, are supported at opposite ends by brackets 86 and 87 affixed within the sheet metal enclosure 19. The tie rods 85 are arranged in two pairs with the stack of insulators 80, 81, and 82 located therebetween, as shown. The insulator 80 at one end of the stack abuts a channel member 88 fastened to the tie rods 85 and bracket 86. The force applying bolt 84 of the clamping assembly is disposed at the other end of the joint threadably carried by bracket 87 and reinforcing plate 89 and passing through an aperture in the channel member 90 to which the tie rods 85 are fastened.

One end of the bolt 84 is located adjacent the insulator 82 and is terminated by a set of spring members 91 of the "Belleville" washer type. The spring members 91 are preferably dish-shaped washers of resilient metal such as spring steel nested in pairs as shown. By tightening the bolt 84, the washers are compressed between the insulator 82 and a shoulder of the bolt. The head of the bolt is shaped to receive a screwdriver or the like for tightening the bolt. Since the laminated conductors 77 would otherwise bar engagement of a tool with bolt 84, an opening is provided through the laminations 77 in alignment with the bolt, the opening being lined with an insulating bushing 92 trapped in place on and through the laminated conductors by nuts at both ends. To add to the electrical insulation of the system, shaped insulating sheets 93 and 94 are provided on opposite sides of the laminated conductors 77 and an additional sheet of insulation 95 is provided on one of the laminated conductors 76 adjacent the other end of the joint assembly.

In addition to those factors already dealt with bearing on the problem of dissipating heat, other features can be incorporated in the busway plug to improve its thermal efficiency. For example, to reduce the heat generated within the enclosure, conducting portions of the assembly in the vicinity of the laminated conductors such as support brackets 86 and 87, channel members 88 and 90, and the like may be made of aluminum or other non-ferrous metals. In addition, the switching device can be mounted in intimate thermal contact with a plate 97 (see FIGURE 1) of aluminum or other heat conducting material to conduct heat away from the base of the switching device adjacent the internal switch contacts, the plate 97 being mounted in firm thermal contact with the back wall of the enclosure. Where required, of course, electrical isolation of electrically conducting elements in thermal contact with the sheet metal enclosure 19 may be secured by interposing between these elements and the enclosure a broad but thin sheet of resilient insulating material such as butyl rubber which will permit a substantial flow of heat thereacross.

While the invention has been shown and described in connection with but one preferred embodiment, it will be readily appreciated that many modifications thereof may be made by those skilled in the art to which the invention pertains. The appended claims are therefore intended to cover all such modifications as fall within the true spirit and scope of the invention.

What I claim as new and desire to secure by Letters Patent of the United States is:

1. A busway plug unit comprising: a sheet metal enclosure; at least three insulated spaced conducting elements extending from within to without said enclosure for connection to bus conductors of a three-phase busway system and terminating within said enclosure in a row of three internal terminals adjacent a wall thereof; three-phase circuit controlling means within said enclosure, said circuit controlling means within said enclosure having a row of three line terminals spaced alongside said row of internal terminals on the opposite side from said enclosure wall; at least one pair of spaced conductor laminations forming a first phase group electrically connecting the central one of said internal terminals and the central one of said line terminals, the conductor laminations of said first phase group extending in a direct course between said central terminals and having further extensions thereof projecting from said central internal terminal toward and thence along said enclosure wall; a thin sheet of electrical insulating material interposed between and in intimate thermal contact with said enclosure wall and said extensions to promote the transfer of heat by conduction from said conductor laminations to said enclosure wall; and two additional phase groups of two or more conductor laminations each connected electrically between respective ones of said internal terminals and said line terminals on opposite sides of said central terminals, said additional phase groups of conductor laminations following a serpentine path projecting outwardly from their associated internal terminals toward said enclosure wall and turning progressively in rsepectively opposite directions toward and into engagement with their respective line terminals, the laminations in said two additional groups being spaced apart between their ends to promote the transfer of heat therefrom by radiation and convection to said enclosure.

2. A busway plug unit comprising: a sheet metal enclosure; at least three insulated spaced conducting elements extending from within without said enclosure for connection to bus conductors of a three-phase busway system and terminating within said enclosure in a row of three internal terminals adjacent a wall thereof; three-phase circuit controlling means within said enclosure for connection to said conducting elements, said circuit controlling means having a row of three line terminals spaced alongside said row of internal terminals on the opposite side from said enclosure wall; a plurality of conductors connecting each of said internal terminals with respective ones of said line terminals, said conductors being arranged in three phase groups each comprising two or more conductive laminations, two of said phase groups of conductors being connected electrically to the endmost ones of said three internal terminals and projecting in indirect serpentine courses in opposite directions toward and into electrical engagement with respectively endmost ones of said line terminals, the laminations in said two phase groups being spaced apart intermediate their respective terminals to promote the transfer of heat therefrom by radiation and convection to said enclosure, the conductors of said third of said phase groups of conductors being spaced throughout their lengths and connected electrically with the central one of said internal terminals and extending in a direct course toward and into electrical engagement with the central one of said line terminals, the conductors in said third phase group having extensions thereof projecting toward and along said adjacent enclosure wall; a thin sheet of electrical insulating material interposed between and in intimate thermal contact with said enclosure wall and said extensions to promote the transfer of heat by conduction from said third phase group conductors to said enclosure wall.

3. A busway plug unit comprising: a sheet metal enclosure; at least three insulated spaced conducting elements extending from within to without said enclosure for connection to bus conductors of a three-phase busway system and terminating within said enclosure in a row of three internal terminals adjacent a wall thereof; three-phase circuit controlling means within said enclosure for connection to said conducting elements, said circuit controlling means having a row of three line terminals spaced alongside said row of internal terminals on the opposite side from said enclosure wall; a plurality of conductors connecting each of said internal terminals with respective ones of said line terminals, said conductors being arranged in three phase groups each comprising two or more conductive laminations, two of said phase groups of conductors being connected electrically to the endmost ones of said three internal terminals and projecting toward and into electrical engagement with respectively endmost ones of said line terminals along indirect paths each having at least one substantially right angle turn, the laminations in said two phase groups being spaced apart intermediate their respective terminals to promote the transfer of heat therefrom by radiation and convection to said enclosure, the conductors of said third of said phase groups of conductors being spaced throughout their lengths and connected electrically with the central one of said internal terminals and extending toward and into electrical engagement with the central one of said line terminals, the conductors in said third phase group having extensions thereof projecting along said adjacent enclosure wall; a thin sheet of electrical insulating material interposed between and in intimate thermal contact with said enclosure wall and said extensions to promote the transfer of heat by conduction from said third phase group conductors to said enclosure wall.

4. A busway plug unit comprising: a sheet metal enclosure; stab connectors extending from within to without said enclosure for connection to bus conductors of a three-phase busway system and terminating within said enclosure in a row of three internal terminals adjacent a wall thereof; switching means within said enclosure for controlling the energization of an electrical load, said switching means having a row of three line terminals spaced alongside said row of internal terminals on the opposite side from said enclosure wall; a pair of conductor laminations forming a first phase group electrically connecting the central terminals in each row, the conductor laminations of said first phase group being spaced throughout their lengths and having extensions thereof projecting toward and thence along said adjacent enclosure wall; a thin sheet of electrical insulating material interposed between and in intimate thermal contact with said enclosure wall and said extensions to promote the transfer of heat from said conductor laminations by conduction to said enclosure wall; and two additional phase groups of two or more conductor laminations each connected electrically between respective ones of said internal terminals and said line terminals, the conductors of each of said additional phase groups being formed in a generally U-shaped configuration and including first lengths projecting outwardly from its associated internal terminal toward said enclosure wall, the conductors of each of said additional phase groups including second lengths turning from said first lengths in respectively opposite directions generally parallel to the extensions of the conductors of said first group, and including third lengths turning from said second lengths toward and into engagement with its respective line terminal, and the laminations in said additional phase groups being spaced apart between their ends to promote the transfer of heat therefrom by radiation and convection to said enclosure.

References Cited in the file of this patent

UNITED STATES PATENTS

| | | |
|---|---|---|
| 1,327,825 | Holt | Jan. 13, 1920 |
| 1,678,508 | Hart | July 24, 1928 |
| 2,938,971 | Meacham et al. | May 31, 1960 |

FOREIGN PATENTS

| | | |
|---|---|---|
| S32,620 | Germany | Dec. 20, 1956 |